(12) United States Patent
Karr et al.

(10) Patent No.: US 7,702,906 B1
(45) Date of Patent: Apr. 20, 2010

(54) SECURING KERNEL METADATA COMMUNICATION IN ENVIRONMENTS EMPLOYING DISTRIBUTED SOFTWARE SERVICES

(75) Inventors: Ronald S. Karr, Palo Alto, CA (US); Anuj Garg, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1142 days.

(21) Appl. No.: 11/190,608

(22) Filed: Jul. 27, 2005

Related U.S. Application Data

(60) Provisional application No. 60/695,651, filed on Jun. 30, 2005.

(51) Int. Cl.
*H04L 29/06* (2006.01)
(52) U.S. Cl. .................................................. 713/164
(58) Field of Classification Search ................. 713/164
See application file for complete search history.

(56) References Cited

U.S. PATENT DOCUMENTS

| | | | |
|---|---|---|---|
| 6,611,812 B2 | 8/2003 | Hurtado et al. | |
| 6,748,550 B2 | 6/2004 | McBrearty et al. | |
| 6,983,371 B1 | 1/2006 | Hurtado et al. | |
| 7,213,005 B2 * | 5/2007 | Mourad et al. | ................. 705/64 |

* cited by examiner

*Primary Examiner*—Kambiz Zand
*Assistant Examiner*—Stephen Sanders
(74) *Attorney, Agent, or Firm*—Rory D. Rankin; Meyertons Hood Kivlin Kowert & Goetzel, P.C.

(57) ABSTRACT

A system for securing kernel metadata communication in environments employing distributed software services includes a first and a second host linked by a network, where a distributed software service stack at each host includes a respective user-mode software layer and a respective kernel-mode software layer. The first host may be configured to establish a user-mode connection with the second host, e.g., using a secure user-mode communication protocol such as SSL (Secure Sockets Layer). The first and the second hosts may then exchange respective security keys over the secure user-mode connection, upload the security keys to the respective kernel-mode software layers, and use the security keys to secure communication over a kernel-mode connection between the two hosts.

23 Claims, 12 Drawing Sheets

Computer
Accessible
Medium 1300

Distributed Service Software 1310

FIG. 13

SECURING KERNEL METADATA COMMUNICATION IN ENVIRONMENTS EMPLOYING DISTRIBUTED SOFTWARE SERVICES

This application claims the benefit of U.S. provisional patent application Ser. No. 60/695,651, entitled "SECURING KERNEL METADATA COMMUNICATION IN ENVIRONMENTS EMPLOYING DISTRIBUTED SOFTWARE SERVICES", filed Jun. 30, 2005.

BACKGROUND OF THE INVENTION

1. Field of the Invention

This invention relates to computer systems and, more particularly, to securing kernel metadata communication in systems employing distributed software services.

2. Description of the Related Art

Many business organizations and governmental entities rely upon applications that process large amounts of data, often exceeding a terabyte or more of data for mission-critical applications. Numerous servers may be utilized to provide the needed processing, and the data may be distributed across multiple, often heterogeneous, storage devices. In order to handle such heavy processing loads and large volumes of data, various types of distributed software services may be used in such environments, such as distributed computing services (e.g., facilities that split up large processing tasks into smaller tasks for execution at various hosts), distributed storage virtualization, cluster management, distributed file systems, distributed content management, distributed workflow management solutions and the like.

In many distributed software service deployments, the software stack at a given computer host may include a user-mode layer and a kernel-mode or privileged layer. The user-mode layer may perform tasks such as data manipulations or computations that require relatively rare interactions with operating system functions such as process management or device interactions, while the kernel-mode layer may interact heavily with the operating systems in use at the hosts. In many cases the kernel-mode layers of the distributed software service stacks at different hosts may need to communicate metadata (e.g., configuration information related to the specific software service being provided) to each other. While in some environments, networks with limited accessibility (e.g., fibre channel links that are isolated from Internet Protocol (IP) networks) may be used for inter-host communication of such metadata, the popularity of shared commodity networks (such as Ethernet-based IP networks) for this purpose is increasing. Typically, secure communication protocols such as Secure Sockets Layer (SSL) may be available for user-mode interactions over such networks, but may not be easily usable for kernel-mode interactions. A technique that utilizes secure communication facilities available at the user-mode layers to achieve secure kernel-to-kernel metadata communication may therefore be desirable.

In particular, distributed storage virtualization services may benefit from such a technique. Distributed storage virtualization includes a set of services to provide enhanced storage functionality and reduce the complexity of dealing with large heterogeneous storage environments. Virtualization services may be configured to present physical storage devices as virtual storage devices (e.g., logical volumes in block storage environments) to storage clients, and to add storage features not present in individual storage devices to the storage model. For example, features to increase fault tolerance, such as data mirroring, snapshot/fixed image creation, or data parity, as well as features to increase data access performance, such as disk striping, may be implemented in the storage model via hardware or software. As in the case of other distributed services, virtualization services software may include user and kernel layers at both virtualization servers (e.g., hosts that provide or support the virtualization features) and virtualization clients (e.g., hosts where the virtualization features are utilized). The metadata that may need to be communicated between kernel layers at virtualization servers and clients may include virtual device layout information (i.e., logical address to physical address translation information), access permissions, security tokens used by various clients to access specific virtual devices, etc. When transmitted over general-purpose networks such as IP networks, such sensitive metadata may result in increased vulnerability to malicious attacks. A mechanism to enhance the security of kernel-to-kernel storage virtualization metadata communication may therefore be particularly beneficial.

SUMMARY OF THE INVENTION

Various embodiments of a system and method for securing kernel metadata communication in environments employing distributed software services are disclosed. According to a first embodiment, a system may include a first and a second host linked by a network, where a distributed software service stack at each host includes a respective user-mode software layer and a respective kernel-mode software layer. The first host may be configured to establish a user-mode connection with the second host, e.g., using a secure user-mode communication protocol such as SSL (Secure Sockets Layer). The first and the second hosts may then exchange respective security keys over the secure user-mode connection, upload the security keys to the respective kernel-mode software layers, and use the security keys to secure communication over a kernel-mode connection between the two hosts.

In one specific embodiment, the first and second hosts may be configured to use public key encryption to secure the kernel-mode communication. For example, the hosts may exchange respective public keys over the user-mode connection, and upload the public keys as well as a local private key to the kernel-mode software layers. Outgoing kernel-mode messages may then be encrypted using the intended recipient's public key, and incoming kernel-mode messages may be decrypted using a local private key.

In another embodiment, token-based authentication may be used. For example, the second host may be configured to send a security key (e.g., including a long random number generated at the second host) to the first host over the secure user-mode connection. On receiving the security key, the first host may be configured to establish a kernel-mode connection with the second host, and to send a first encoded authentication token to the second host over the kernel-mode connection. The authentication token may, for example, consist of an encrypted version of a data object whose contents are known at both hosts, and the encryption may be performed using the security key sent by the second host. The second host may be configured to validate the first authentication token, e.g., by decrypting it using the security key and ensuring that the decrypted token matches the data object. The second host may be configured to send the security key to the first host in response to a request sent on the secure user-mode connection from the first host in one embodiment, where the request may itself include an additional security key associated with the first host. If the validation of the first authentication token is successful, the second host may send a second encoded authentication token to the first host over the kernel-mode connection. The second encoded authenticated token may, for example, consist of a version of the known data object that has been encrypted using the additional security key provided by the first host. The first host may be configured to validate the second encoded authentication token, e.g., by decrypting it using the additional security key and ensuring that the decrypted token matches the data object.

When each of the first and second hosts has successfully validated the encoded authentication token received by it, each host may designate the kernel-mode connection as being secure, and may commence communicating metadata related to the distributed software service over the secure kernel-mode connection. In one embodiment, each message sent over the secure kernel-mode connection may itself be encrypted prior to transmission. In other embodiments, secure sequence numbers and/or checksums may be used to validate messages sent over the secure kernel-mode connection.

In one embodiment, the distributed software service may be distributed storage virtualization. The first host may be a virtual device client, and the second host may be a virtual device server configured to aggregate storage in one or more physical storage devices into a virtual storage device, and to provide metadata for the virtual storage device to the virtual device client over the secure kernel-mode connection. In one implementation, the virtual device client and virtual device server may be configured to communicate (e.g., in both user-mode and kernel-mode) over a first network type, such as an IP-based network, while I/O to storage devices from the virtual device client and/or the virtual device server may be performed over a second network type (e.g., over a fibre channel network). In some embodiments, the distributed storage virtualization may be distributed block virtualization, while in other embodiments, object-based virtualization may be employed.

BRIEF DESCRIPTION OF THE DRAWINGS

FIG. 13 is a block diagram of one embodiment of a computer accessible medium.

Figure 1:
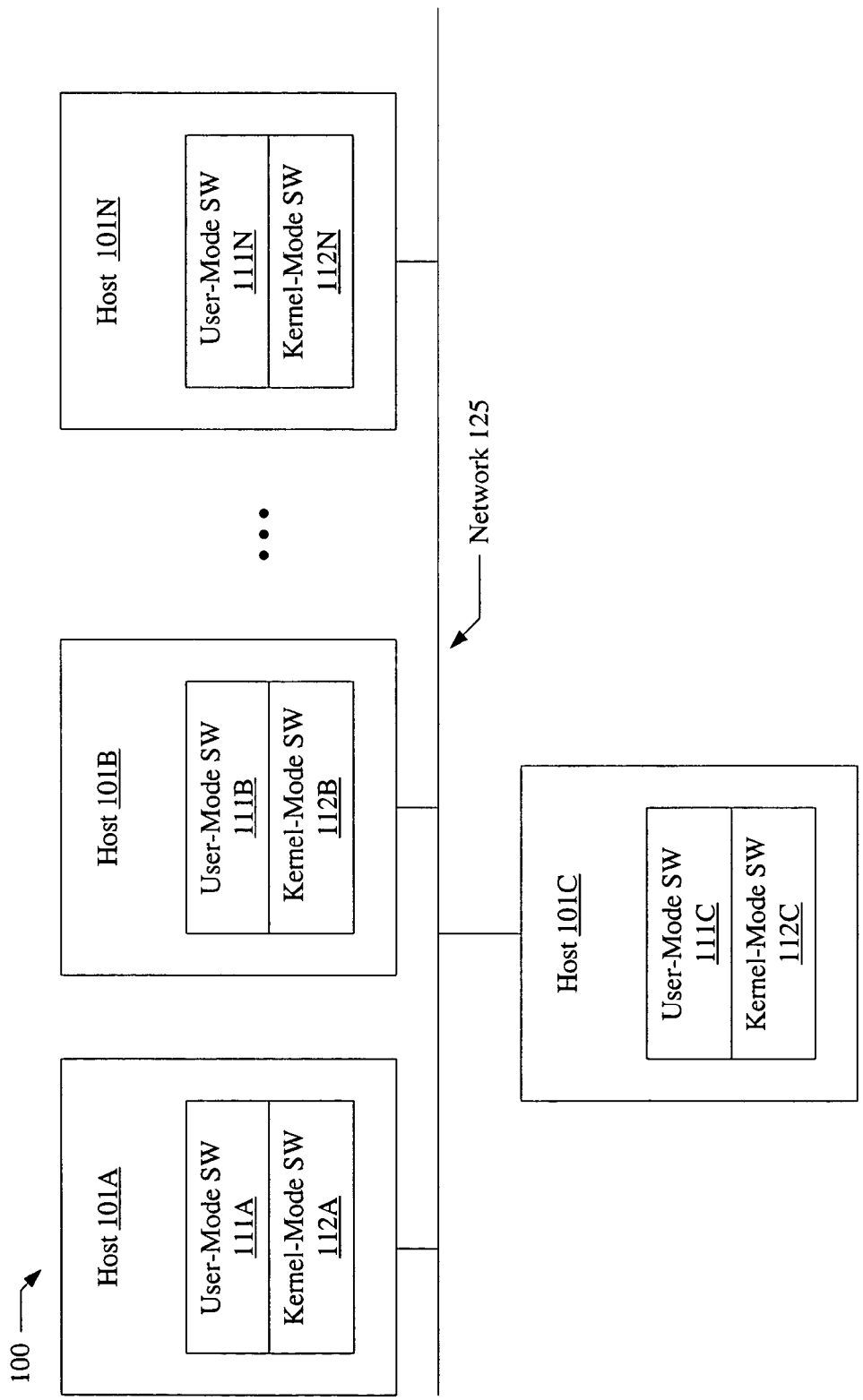
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates a system 100 according to one embodiment. In the illustrated embodiment, system 100 includes a plurality of computer hosts 101A, 101B, 101C . . . 101N (which may be collectively referred to herein as hosts 101) coupled to a network 125. Each host 101 includes a respective distributed software service stack including a respective user-mode software layer 111 and a kernel-mode software layer 112—e.g., host 101A includes a user-mode software layer 111A and a kernel-mode software layer 112A, host 101B includes a user-mode software layer 111B and a kernel-mode software layer 112B, etc. A user-mode software layer 111 may perform tasks such as data manipulations or computations that involve relatively rare interactions with operating system functions such as process management or device interactions. A kernel-mode software layer 112 may interact heavily with the operating systems in use at the hosts to support the user-mode operations, and may, for example, directly manipulate kernel devices, utilize kernel-level programming interfaces, etc. A user-mode software layer 111 at a given host participating in the distributed software service may communicate over one or more network connections (e.g., TCP/IP connections) with user-mode software layers at other hosts 101, and similarly, a kernel-mode software layer 112 at a given host may communicate over network connections with kernel-mode software layers at other hosts 101.

The distributed software service may provide any of a number of different types of functions, such as distributed storage virtualization (described below in further detail), distributed computing services, cluster management services, etc. At least one of the hosts 101 may be a server configured to provide the distributed software service and distribute metadata for the software service to other hosts, and at least one of the hosts 101 may be a client configured to utilize the functionality provided by the distributed software service. In addition, in some embodiments, one or more of the hosts 101 may provide other functions related to the distributed software service, such as a centralized configuration database. For example, hosts 101A and 101B may be clients, host 101C may be a server and host 101N may be a configuration database server in one embodiment. The specific functionality provided by a given user-mode software layer 111 and kernel-mode software layer 112 may differ from one host to another, depending on the role (e.g., server, client, configuration database, etc.) of the host participating in the distributed software service. Network 125 may be implemented using any suitable network technology such as Ethernet, Token-Ring, etc., and may utilize any desired networking protocol, such as the Internet Protocol (IP), or a combination of protocols such as Fibre Channel as well as IP.

In some embodiments, the user-mode software layer 111 at any given host such as 101A may have the capability of using a secure user-mode communication protocol to establish a network connection over network 125 with a user-mode software layer 111 at any other host such as 101B. For example, in one embodiment, two user-mode software layers 111A and 111B may utilize the Secure Sockets Layer (SSL) protocol to establish a secure user-mode connection. SSL is an IETF (Internet Engineering Task Force) approved protocol for ensuring that a connection between two end points is private and secure by providing authentication and encryption. Alternately, another protocol or set of protocols such as IPSec (IP Security) may be used to implement secure user-mode connections between hosts 110. IPSec consists of a set of protocols developed by the IETF to support secure exchange of packets at the IP layer. In other embodiments, a vendor-specific protocol or a vendor-specific set of security services, which may be implemented using an industry standard protocol such as SSL or IPSec, and may provide additional functionality beyond that provided by the underlying industry standard protocol, may be used to secure user-mode communication.

In many environments, the secure user-mode communication protocol may not be directly accessible for use by the kernel-mode software layers 112 for kernel-to-kernel communication (e.g., exchange of metadata associated with the distributed software service) between two hosts. Instead, a kernel-mode software layer 112 at a given host 101 may utilize the secure communication facilities available to user-mode software layers 111 to exchange security information (such as keys that may later be used for encryption) with another kernel-mode software layer at a different host, and use such security information to authenticate subsequent kernel-to-kernel communication, as described below.

Figure 2:
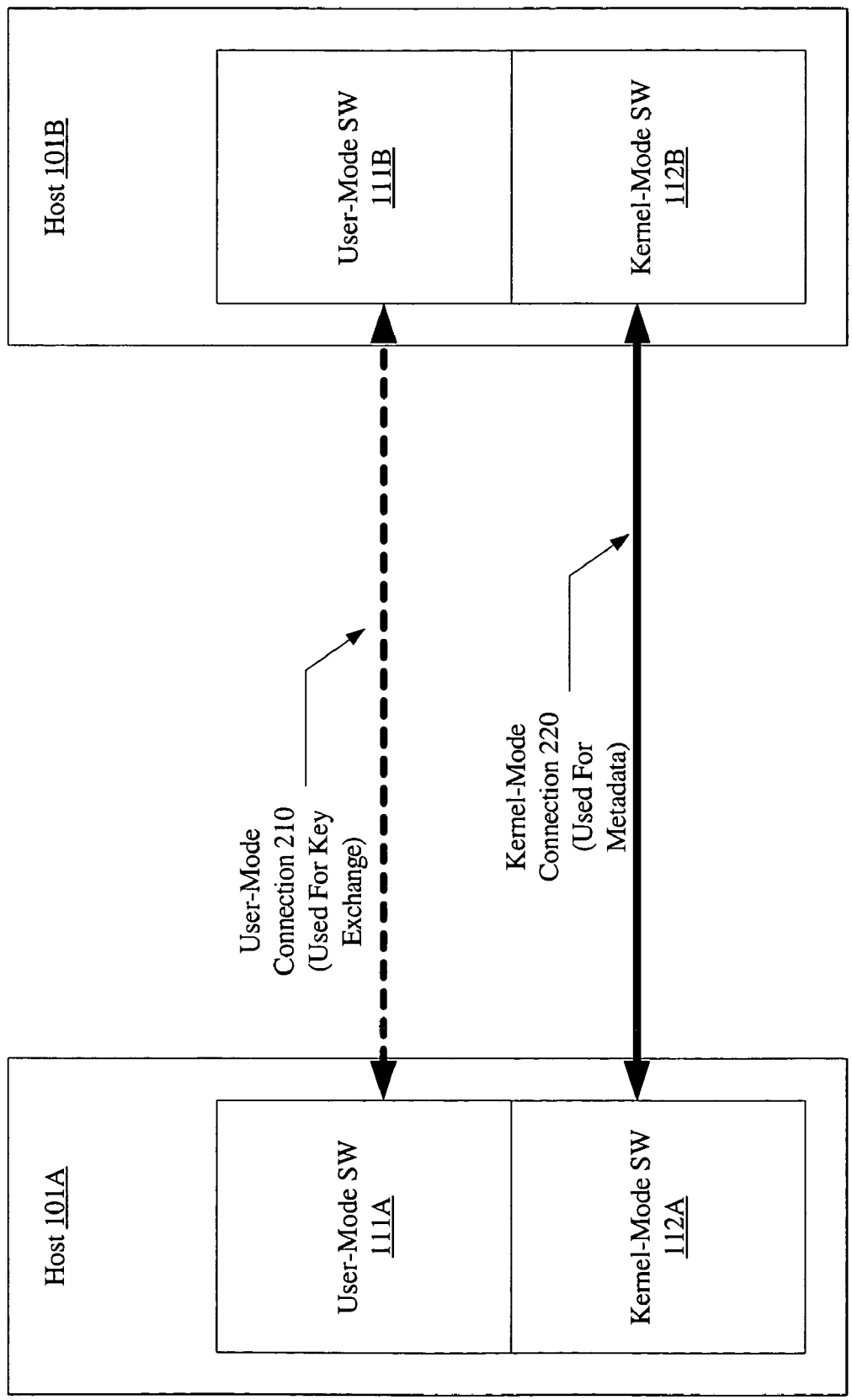
FIG. 2 is a block diagram illustrating a pair of hosts configured to utilize a user-mode network connection to secure kernel-to-kernel metadata communication according to one embodiment.
Figure 3:
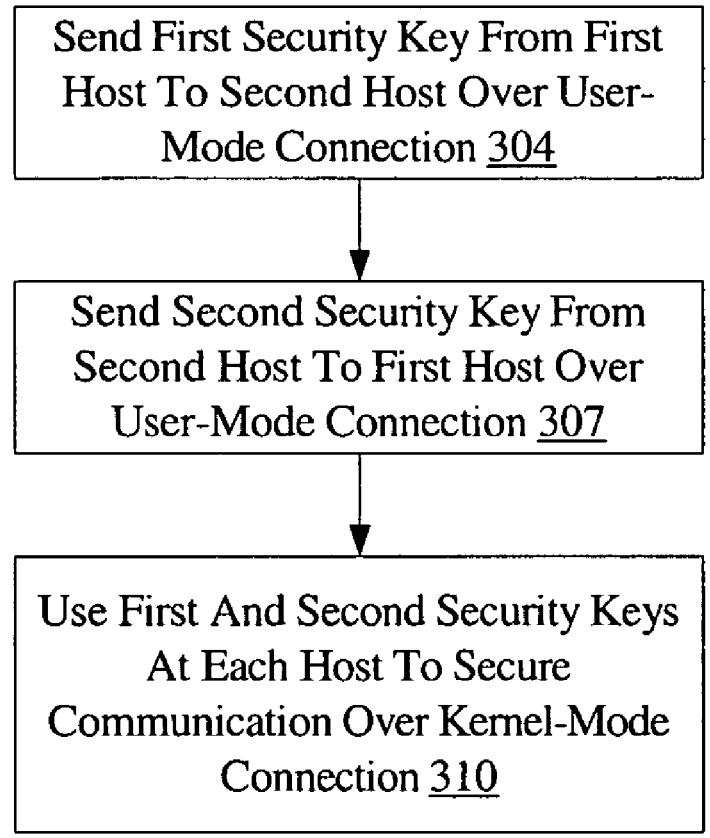
FIG. 3 is a flow diagram illustrating aspects of the operations of the two hosts depicted in FIG. 2, according to one particular embodiment.

FIG. 2 is a block diagram illustrating a pair of hosts 101A and 101B configured to utilize a user-mode network connection 210 to secure kernel-to-kernel metadata communication according to one embodiment, and FIG. 3 is a flow diagram illustrating aspects of the operations of the two hosts depicted in FIG. 2 to establish secure kernel-to-kernel communication, according to one embodiment. After a user-mode network connection 210 has been established between their respective user-mode software layers 111 (e.g., using a secure protocol such as SSL), hosts 101A and 101B may exchange security keys over the user-mode network connection. For example, host 101A may be configured to send a first security key over the user-mode network to host 101B (block 304 of FIG. 3), and host 101B may be configured to send a second security key to host 101A over the user-mode network (block 307). Each host having received the other host's security key, the two hosts may use the two keys to secure subsequent communication over a kernel-mode network connection between their respective kernel-mode software layers 112 (block 310). A number of different techniques may be used to secure the kernel-mode communication in different embodiments, as described below in further detail. For example, in one embodiment, public key encryption may be used, while in other embodiments, token authentication may be used.

Figure 4:
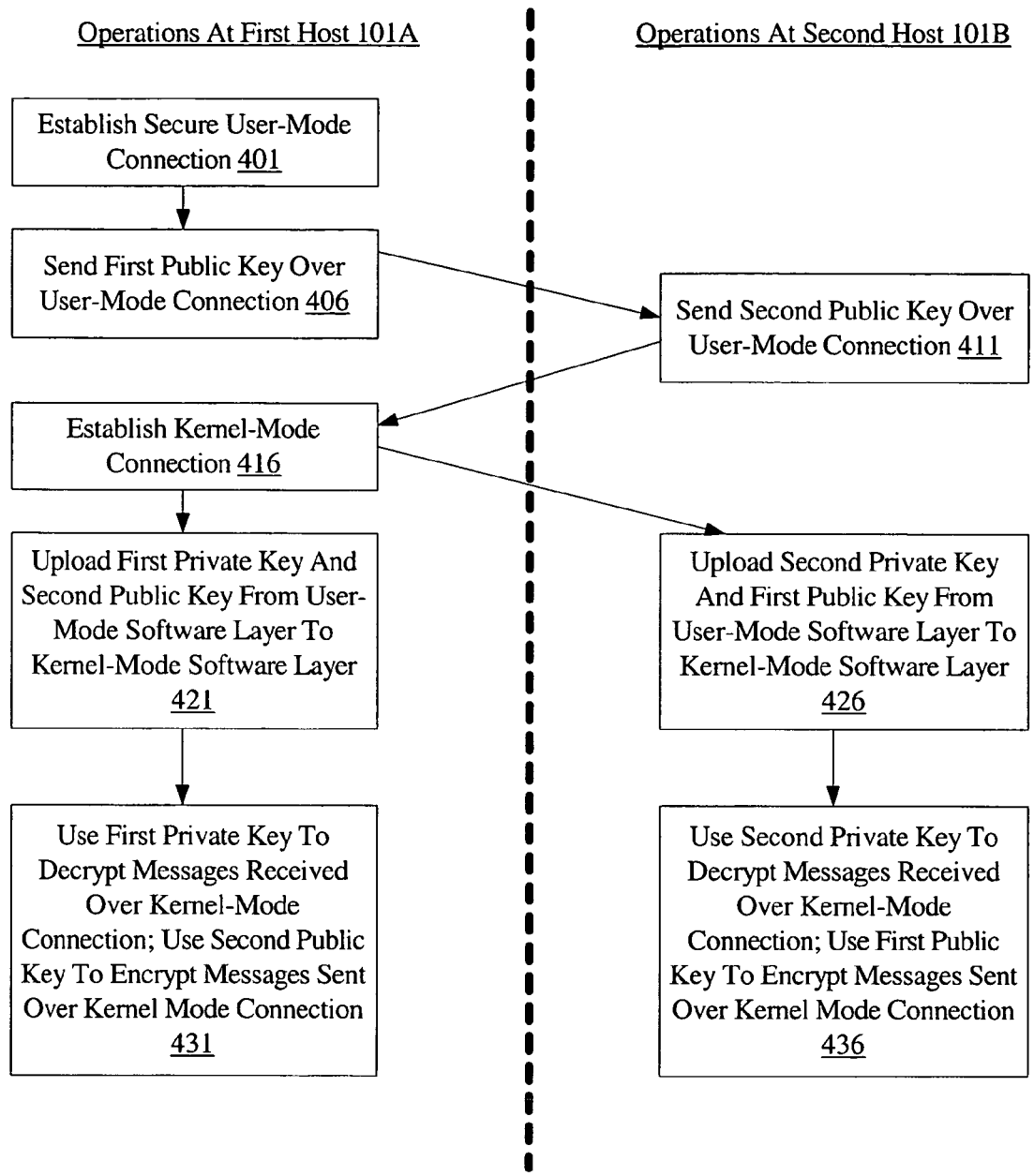
FIG. 4 is a flow diagram illustrating an embodiment where a pair of hosts are configured to use a public key encryption algorithm to secure the kernel-mode communication.

FIG. 4 is a flow diagram illustrating an embodiment where hosts 101A and 101B are configured to use a public key encryption algorithm to secure the kernel-mode communication. In general, a cryptographic system that uses public key encryption may employ two types of security keys: public keys known to more than one communicating participant (e.g., to both participants in a two-way communication), and private (i.e., unshared) keys associated with each participant. When a first participant, such as a kernel-mode software layer 112A at host 101A, wishes to send a secure message to a second participant, such as a kernel-mode software layer 112B at host 101B, the first participant uses the second participant's public key to encrypt the message. When the second participant receives the message, it uses the second participant's private key to decrypt the message. Public and private keys are mathematically related in such a way that only the corresponding private key can be used to decrypt a message encrypted with a public key. Moreover, the mathematical properties of the public and private keys may make it very hard or practically impossible to deduce the private key, even if the public key is known.

As shown in block 401 of FIG. 4, a first step in securing kernel-mode communication may include establishing a secure user-mode connection between the two hosts' user-mode software layers 111, which may be initiated for example by host 101A in the depicted embodiment. That is, user-mode software layer 111A at host 101A may initiate the establishment of connection 210 using a secure user-mode communication protocol as described above, and user-mode software layer 111B at host 101B may participate in the protocol to complete the establishment of the connection 210. Host 101A may then send its public key to host 101B over the user-mode connection (block 406), and in turn receive the public key associated with host 101B over the user-mode connection (block 411). Host 101A may then initiate an establishment of a kernel-mode network connection 220 (illustrated in FIG. 2) between its kernel-mode software layer 112A and the kernel-mode software layer 112B of host 101B (block 416). The kernel-mode network connection may be established using any networking programming interface or service available at the kernel level in various embodiments, such as kernel sockets, TLI (Transport Level Interface), XTI (X/Open Transport Interface) etc. Kernel-mode software layer 112A may then upload host 101B's public key from user-mode software layer 111A, and may also upload host 101A's private key (block 421). Similarly, kernel-mode software layer 112B at host 101B may upload host 101A's public key from user-mode software layer 111B, along with host 101B's private key (block 426). The kernel-mode software layers 112 at each host 101 may then use the public key of the other host to encrypt outbound metadata messages, and use the local private key to decrypt inbound metadata messages received over the kernel-mode network connection (blocks 431 and 436), in accordance with a public key encryption protocol. For example, kernel-mode software layer 112A may use host 101B's public key to encrypt metadata message sent to kernel-mode software layer 112B, and may use host 101A's private key to decrypt metadata messages received from kernel-mode software layer 112B. In some embodiments, the user-mode connection 210 may be terminated when kernel mode communication is secured by the exchange and uploading of keys, while it may continue to remain open for other user-mode communication in other embodiments.

Figure 5:
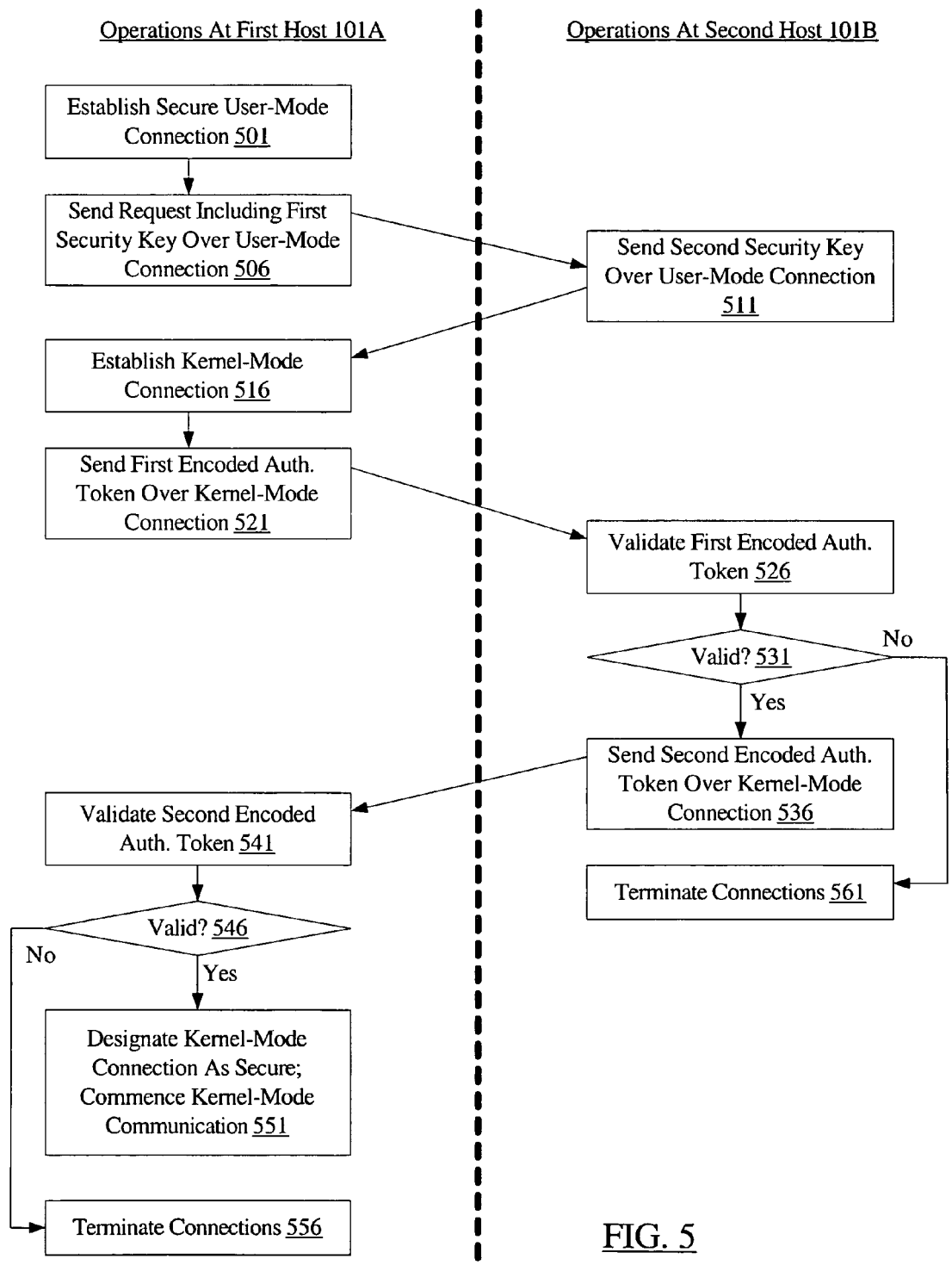
FIG. 5 is a flow diagram illustrating an embodiment where a pair of hosts are configured to use token-based authentication to secure the kernel-mode communication.

In another embodiment, a token-based authentication scheme may be employed instead of a public key encryption algorithm. FIG. 5 is a block diagram illustrating aspects of the operation of hosts 101A and 101B in such an embodiment. As in FIG. 4, host 101A may initiate the process of securing kernel-to-kernel communication by establishing a secure user-mode network connection 210 with the second host 101B (block 501). The user-mode software layer 111A may then send a request including a first security key to user-mode software layer 111B over connection 210 (block 506). Further details on the implementation and properties of the security key that may be used in embodiments employing token-based authentication are provided below. On receiving the request, user-mode software layer 111B at host 101B may send a second security key back to host 101A (block 511) over user-mode connection 210. After a secure exchange of keys has been completed at the user-mode software layers 111A and 111B, the first and second keys may be uploaded to the kernel-mode software layers 112A and 112B at both hosts 101A and 101B. In some embodiments, the user-mode connection 210 may be terminated at this point, while it may continue to remain open for other user-mode communication in other embodiments.

Kernel-mode software layer 112A at host 101A may then establish a kernel-mode connection 220 with kernel-mode software layer 112B at host 101B (block 516), and send an encoded authentication token or identification to kernel-mode software layer 112B (block 521). The contents of the encoded authentication token or identification, and the method used for encoding the token, may vary in different embodiments. In one embodiment, for example, the encoded authentication token may consist of an encryption, using the second security key, of the contents of a known data object; e.g., a static or unchanging string or array of characters, that is accessible from the kernel-mode software 112 at each host 101, and that is initialized with the same value at all hosts 101. In another embodiment, a combination of the first and second security keys, or combinations of subsets of the first and second keys may be used.

Upon receiving the encoded authentication token, kernel-mode software layer 112B at host 101B may be configured to validate the authentication token (block 526). The specific operations included in the validation may vary in different embodiments, depending on the method used to encode the token at host 101A. In an embodiment such as the one described in the example above, where the encoded authentication token is an encrypted version of a data object accessible to kernel-mode software layer 112B, the validation may consist of decrypting the authentication token using an appropriate key (e.g., the second security key), and verifying that the decrypted authentication token matches the content of the known data object. A successful match of the decrypted authentication token with the known data object may be interpreted by kernel-mode software layer 112B as an indication that kernel-mode software layer 112A has successfully uploaded the second security key previously transmitted over the secure user-mode connection 210.

If the validation is successful (as detected in decision block 531), the kernel-mode software layer 112B may send a second encoded authentication token to host 101A (block 536). The second encoded authentication token may be created using a similar technique to that used for the first encoded authentication token, e.g., an encryption of a known data object using the first security key. If the validation is unsuccessful, e.g., if the decrypted contents of the authentication token sent by host 101A do not match the contents of the known data object, kernel-mode software layer 112B may assume that the encoded authentication token is not from a trusted entity, and may terminate the kernel-mode connection 220 (block 561).

Upon receiving the second encoded authentication token, kernel-mode software layer 112A may be configured to perform a similar validation (block 541) as described above. For example, the validation may consist of a decryption of the second authentication token, using the first security key, and a matching of the decrypted authentication token with the contents of the known data object. If the validation is successful (as detected in block 546), kernel-mode software layer 112B may designate the connection 220 as being a secure connection with a trusted peer, and may commence kernel-to-kernel communication (e.g., transmission of metadata and/or metadata-related requests) over connection 220 (block 551). If the validation is unsuccessful, kernel-mode software layer 112A may terminate connection 220 (block 556).

The exchange of security keys and the validation of the encoded authentication tokens, as described above, may serve to authenticate the two kernel-mode software layers 112A and 112B to each other, i.e., to allow each kernel-mode software layer to infer that connection 220 has been established with a trusted entity. In some embodiments, for additional security, subsequent messages sent over connection 220 may also be encrypted by the sender, and decrypted by the receiver, e.g. using the same encryption techniques used for encoding and decoding the authentication tokens sent previously, or using some other encryption facility. In some embodiments, once the kernel-mode connection has been made secure, techniques such as secure sequence numbers and/or checksums may be used to validate successive messages to further enhance the security of kernel-mode communication. For example, in one implementation, the sender of a message over a secure kernel-mode connection may be configured to include an encoding of a sequence number within each message, and the receiver may be configured to decode the sequence number to validate the message (e.g., messages that do not include the expected sequence number may be discarded). In another implementation, a checksum value may be derived from the contents of each message and included within the message in an encoded or encrypted form, and the encoded checksum may be used to validate the message at the receiver. It is noted that in other embodiments, messages sent over kernel-mode connection 220 may be sent in unencrypted format, e.g., using clear text.

After a kernel-mode connection 220 has been designated as secure, it may be kept open for long-term use in some embodiments. A pool of such persistent secure kernel-to-kernel connections 220 may be maintained between a given pair of hosts 101 in some embodiments, and a particular connection from the pool may be selected for the next metadata communication based on a connection pool management policy, such as a round-robin scheduling policy that attempts to distribute load evenly among different connections in the pool. In some embodiments, the security keys associated with a particular pair of hosts may be maintained in a persistent connection record database at each of the two hosts. If a new kernel-to-kernel connection 220 is desired between two hosts 101A and 101B, the user-mode operations described above (e.g., the operations corresponding to blocks 501, 506 and 511) may be omitted, as the security keys may already be available from the connection record database at each host. In other embodiments employing token-based authentication, unique security keys may be maintained for each kernel-mode connection 220 between two hosts, so an exchange of security keys over a secure user-mode connection 210 may be required whenever a new kernel-mode connection 220 is established.

Figure 6:
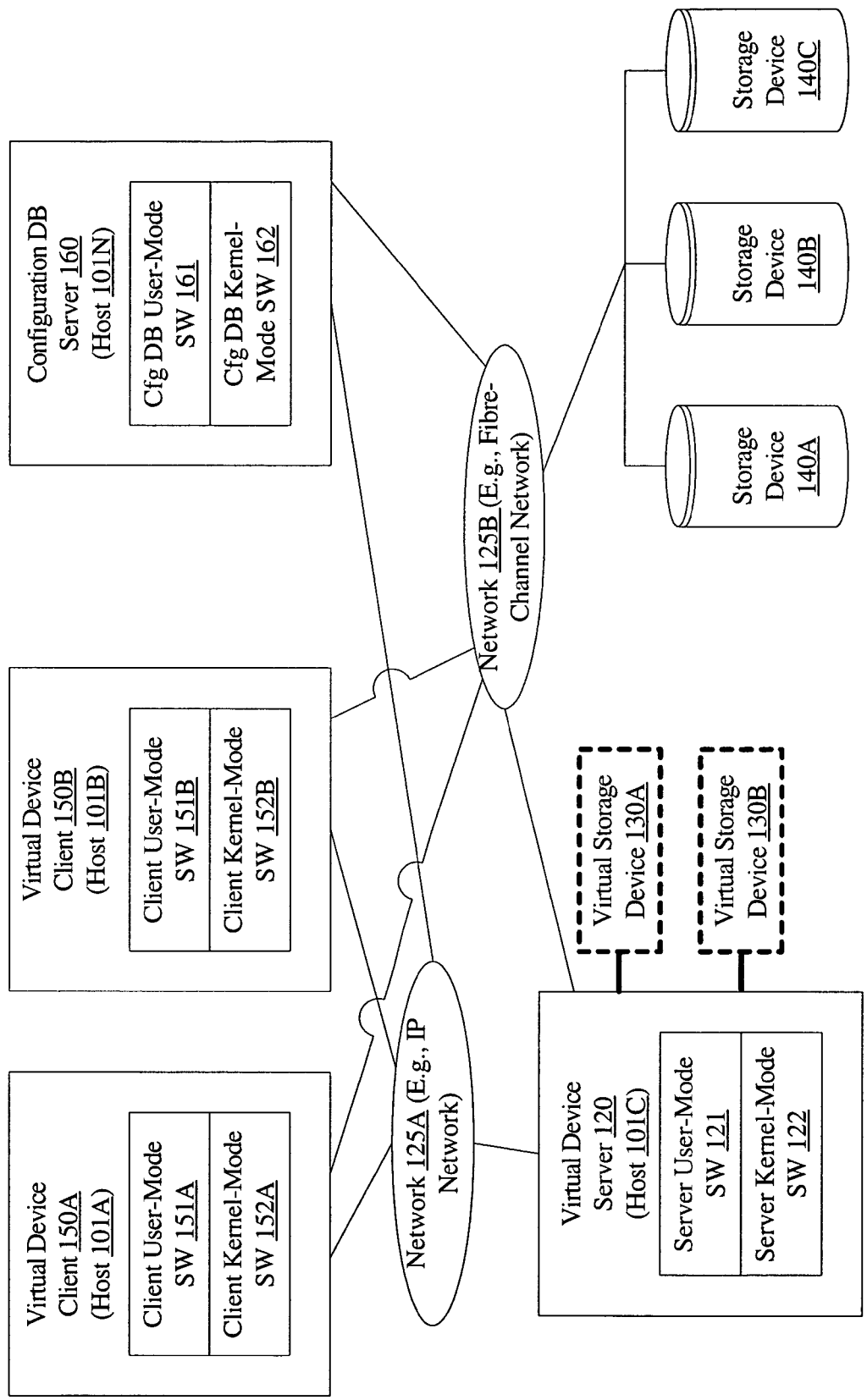
FIG. 6 is a block diagram illustrating an embodiment where the distributed software service is distributed storage virtualization.

In one embodiment, the distributed software service implemented at hosts 101 may be distributed storage virtualization. FIG. 6 is a block diagram illustrating such an embodiment, where a virtual device server 120 (at host 101C) may be configured to aggregate storage within storage devices 140A-140C (collectively, storage devices 140) into one or more virtual storage devices such as 130A and 130B, and to provide metadata on the virtual storage devices to virtual device clients 150A (at host 101A) and 150B (at host 101B) over secure kernel-mode connections. In the depicted embodiment, configuration information related to the virtual storage devices may be maintained at a configuration database server 160 (at host 101N). It is noted that in some embodiments, configuration information may be maintained at a virtual device server 120, or distributed among various virtual device servers 120, instead of being stored at a configuration database server 160—i.e., in some embodiments, a separate configuration database server may not be present. Any of a number of different virtualization primitives may be utilized for distributed storage virtualization in different embodiments. For example, in block virtualization, virtualized storage may be represented as a linear array of blocks, while in object-based virtualization, higher level virtual objects such as files may be provided to virtual device clients. Further details on the kinds of storage virtualization functions, and the properties of various types of virtual storage devices 130 in different embodiments, are provided below.

Each host depicted in FIG. 6 may include a user-mode software layer and a kernel-mode software layer. Virtual device client 150A may include client user-mode software layer 151A and client kernel-mode software layer 152A, while virtual device client 150B may include client user-mode software layer 151B and client kernel-mode software layer 152B. Virtual device server 120 may include server user-mode software layer 121 and server kernel-mode software layer 122, and configuration database server 160 may include configuration database user-mode software layer 161 and configuration database kernel-mode software layer 162. In the subsequent description, the term "virtualization participant" may be used to refer generically to the hosts depicted in FIG. 6, i.e., virtual device servers 120, virtual device clients 150, and configuration database servers 160 may collectively be referred to as virtualization participants. In addition, the numeric identifier 111 may be used to refer to a user-mode software layer at any virtualization participant (i.e., layers 151, 121 or 161), and the numeric identifier 112 may be used to refer to a kernel-mode software layer at any virtualization participant (i.e., layers 152, 122 or 162). User-mode communication between any two virtualization participants may be possible over a secure user-mode communication protocol, such as a protocol utilizing SSL and/or one or more IPSec protocols. Kernel-mode communication between virtualization participants may be made secure using techniques similar to those described above in conjunction with the description of FIG. 4 or FIG. 5. It is noted that in the embodiment depicted in FIG. 6, virtualization participants (e.g., virtual device server 120 and virtual device clients 150) may, be configured to use a first network 125A (e.g., an IP-based network) to communicate with one another, and a second network 125B (e.g., a fibre channel based storage network, independent of the first network) to perform I/O on storage devices 140. Network 125A may be used for both user-mode and kernel-mode communication. In other embodiments, a single network may be used for communication between virtualization participants and also for I/O to storage devices.

In some embodiments, each virtualization participant may have an associated globally unique identifier (GUID), which may be used in securing the kernel-mode connections as described below. For example, in one embodiment, whenever a new host joins the existing virtualization participants as a virtual device client or virtual device server, the new host may be provided a GUID from the configuration database server 160. In other embodiments, each host may be configured to generate its own GUID, e.g., using some unique property of the host such as a serial number, a software license key, and/or a network address.

The process of securing kernel-mode communication with another host may be initiated by any virtualization participant. For example, a virtual device client 150 may initiate a process to secure kernel-mode communication with a virtual device server 120 or with another virtual device client 150; a virtual device server 120 may initiate a process to secure kernel-mode communication with a virtual device client 150 or configuration database server 160, etc., using any of the techniques described above, e.g., using public key encryption or token-based authentication.

Figure 7:
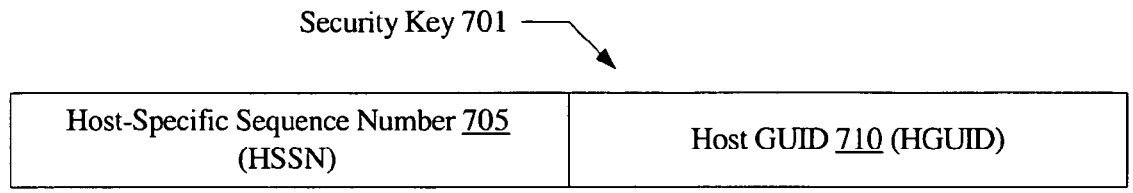
FIG. 7 is a block diagram illustrating an exemplary implementation of a security key.

FIG. 7 is a block diagram illustrating an exemplary implementation of a security key 701 (such as the client security key sent to the virtual device server 150), according to one embodiment. Security key 701 may include a host-specific sequence number (HSSN) 705 as well as a host GUID (HGUID) 710 in the depicted embodiment. The lengths (number of bits or bytes) of HSSN 705 and HGUID 710 may vary in different embodiments; in general, the longer the security key, the less vulnerable it may be to an impersonation attempt from a malicious intruder. In one embodiment, a security key 701 may also include other components, such as a timestamp indicative of a time at which the key was created, or an indication of the specific role of the virtualization participant (e.g., virtual device client vs. virtual device server vs. configuration database). Security keys may not include one of the depicted components (i.e., an HSSN 705 or an HGUID 710) in some embodiments. In one specific embodiment, the length of a security key may vary for different virtualization participants. For example, in some virtualization environments, a subset of virtualization participants (such as virtual device servers 120 and configuration database server 160) may require a greater level of security than other virtualization participants (such as virtual device clients 150). In such an embodiment, a longer key (e.g., with a longer HSSN 705 or a longer HGUID 710) may be used for those virtualization participants requiring the greater level of security. That is, the properties of security keys may differ from one type of virtualization participant to another, to support varying or asymmetric levels of security. In some embodiments, HSSNs 705 may be obtained from a random number generator.

Figure 8:
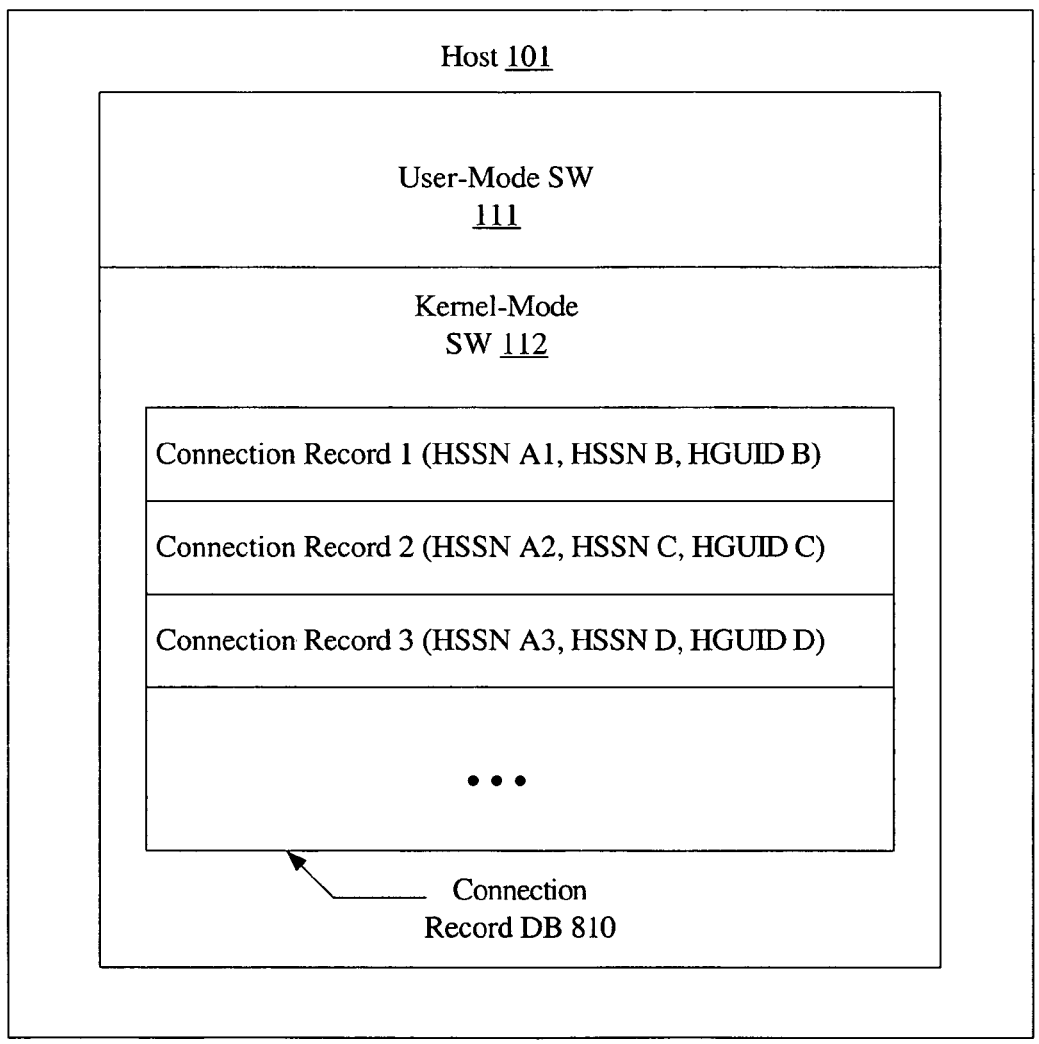
FIG. 8 is a block diagram illustrating one embodiment where a persistent connection record database may be maintained within the kernel-mode software layer at a host.

Upon receiving the client security key over the secure user-mode connection, virtual device server 120 may be configured to send a server security key back to the virtual device client 150 over the same secure user-mode connection, as illustrated in blocks 506 and 511 of FIG. 5. As noted above, the length or format of a server security key may differ from that of a client security key in some embodiments. When both virtual device client 150 and virtual device server 120 have received each other's security keys, the security keys may be uploaded to the kernel-mode software layers on both sides. As noted earlier, in some embodiments, the security keys for a given connection or for a given pair of hosts may be stored within a persistent connection record database. FIG. 8 is a block diagram illustrating one embodiment where a persistent connection record database 810 may be maintained within the kernel-mode software layer 112 at a host 101. In the depicted embodiment, each connection record stored at the host 101 may include HSSNs generated at the host 101 for different connections (e.g., HSSNs A1, A2, A3), as well as the HSSNs and HGUIDs of other hosts with which kernel-mode connections have been established. In some embodiments, the HGUID of host 101, and/or any other constituent components of security keys 701, may also be stored within each connection record. In some embodiments, the connection record database 810 may be accessible by both user-mode software layer 111 (e.g., layer 121, 151, or 161) and kernel-mode software layer 112 (e.g., layer 122, 152 or 162).

In embodiments employing authentication tokens, after the security keys have been uploaded to the client kernel-mode software layer 152 and the server kernel-mode software layer 122, the client kernel-mode software layer 152 may establish a kernel-mode network connection with the server kernel-mode software layer 122, and send an encoded client authentication token or authentication token to the virtual device server. The client authentication token may consist of an encrypted version of a known data object, as described previously in conjunction with the description of FIG. 5. In some embodiments, a part of the client security key (such as a client HSSN 705) may be used to encrypt the known data object, rather than the entire client security key. The server's kernel-mode software layer 122 may validate the encoded client authentication token, e.g. by decrypting the authentication token using all or part of the client security key. If the validation succeeds, the server kernel-mode software layer 122 may send an encoded server authentication token back over the kernel-mode connection. The server authentication token may also be encoded using a similar technique as used during client authentication token encoding, such as an encryption of a known data object using all or part of the server security key. The virtual device client 150 may be configured to validate the server authentication token, e.g., by decryption using part or all of the server security key. If the validation is successful, the virtual device client may designate the kernel-mode connection as secure and commence kernel-mode communication with the virtual device server. A validation failure at either participant may result in a termination of the kernel-mode connection.

In some embodiments employing a connection record database 810 where security keys are re-used for multiple kernel-mode connections between a given pair of virtualization participants, the user-mode interactions described above may not be necessary in all cases. The initiating virtualization participant (e.g., virtual device client 150 in the embodiment of FIG. 6) may be configured to search its connection record database 810 for an entry containing a pre-existing security key of the targeted virtualization participant (e.g., virtual device server 120 in FIG. 6) to which the kernel-mode connection is being set up. If such a pre-existing security key is found, it may be re-used without performing the user-mode exchange of security keys. If no pre-existing key is found, a user-mode exchange of security keys may be performed. In some embodiments, security keys may have associated expiration periods. A pre-existing connection record for an inactive connection may be deleted from a connection record database 810 upon an expiration of a security key contained within the connection record.

Figure 9:
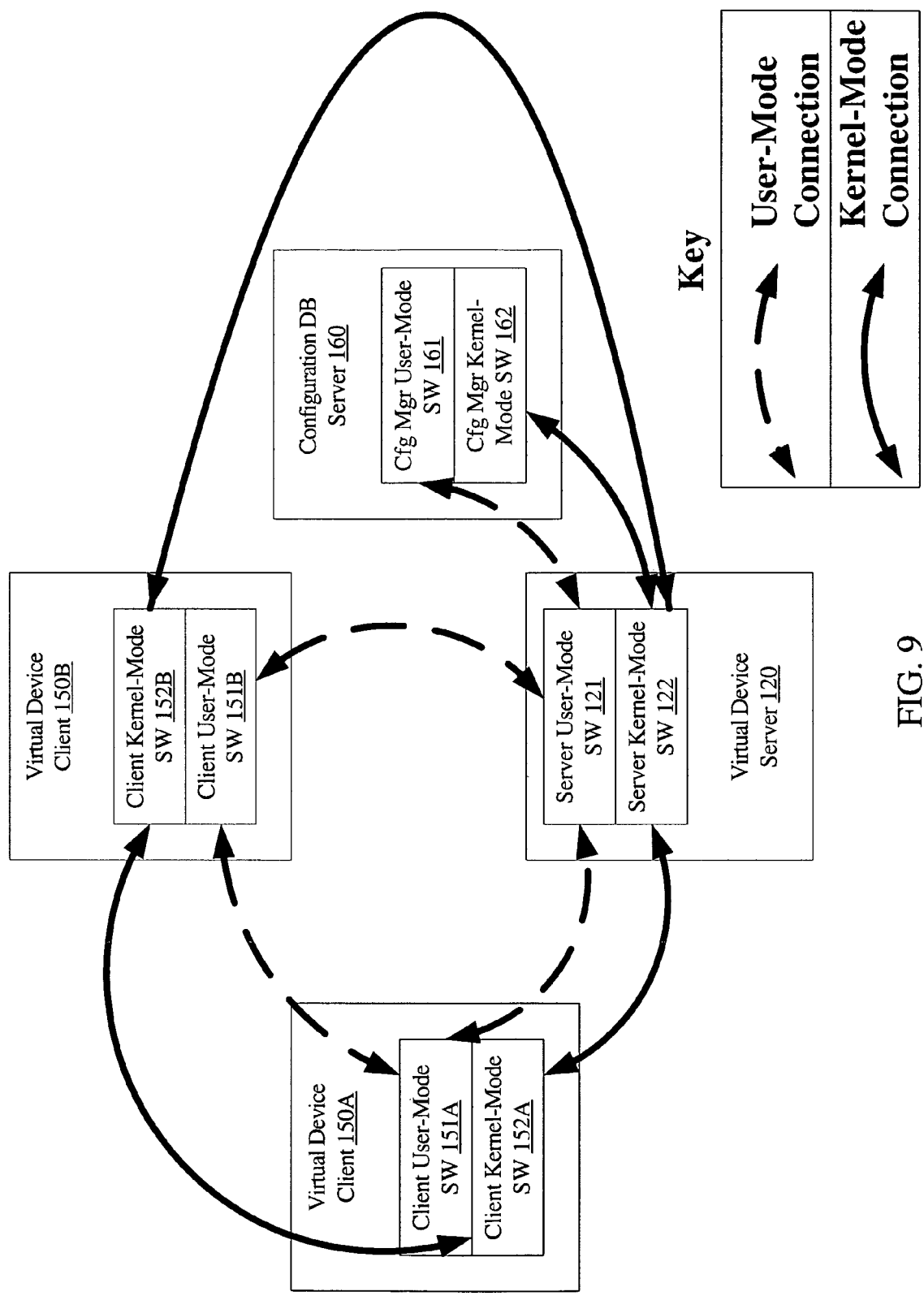
FIG. 9 is a block diagram illustrating an embodiment where a virtual device server may have established secure kernel-mode connections with three other virtualization participants.

As noted earlier, in general, any virtualization participant may initiate the process of securing kernel-mode communication with another virtualization participant. FIG. 9 is a block diagram illustrating an embodiment where a virtual device server 120 may have established secure kernel-mode connections with three other virtualization participants: virtual device clients 150A and 150B, and configuration database server 160. In the illustrated embodiment, virtual device server 120 may have initiated the establishment of a first secure kernel-mode connection with virtual device client 150B, and a second secure kernel-mode connection with configuration database server 160. Virtual device client 150A may have initiated the establishment of its secure kernel-mode connections with virtual device client 150B and with virtual device server 120. In general, any number of virtualization participants including multiple virtual device servers 120 and multiple configuration database servers 160, may be configured within a storage virtualization environment, and any number (including zero) of kernel-mode connections may be established between a given pair of virtualization participants. Not all virtualization participants may establish kernel-level connections with all other virtualization participants in a given embodiment, as shown in FIG. 9, where virtual device clients 150 may not need to communicate at a kernel level with configuration database server 160.

Figure 10:
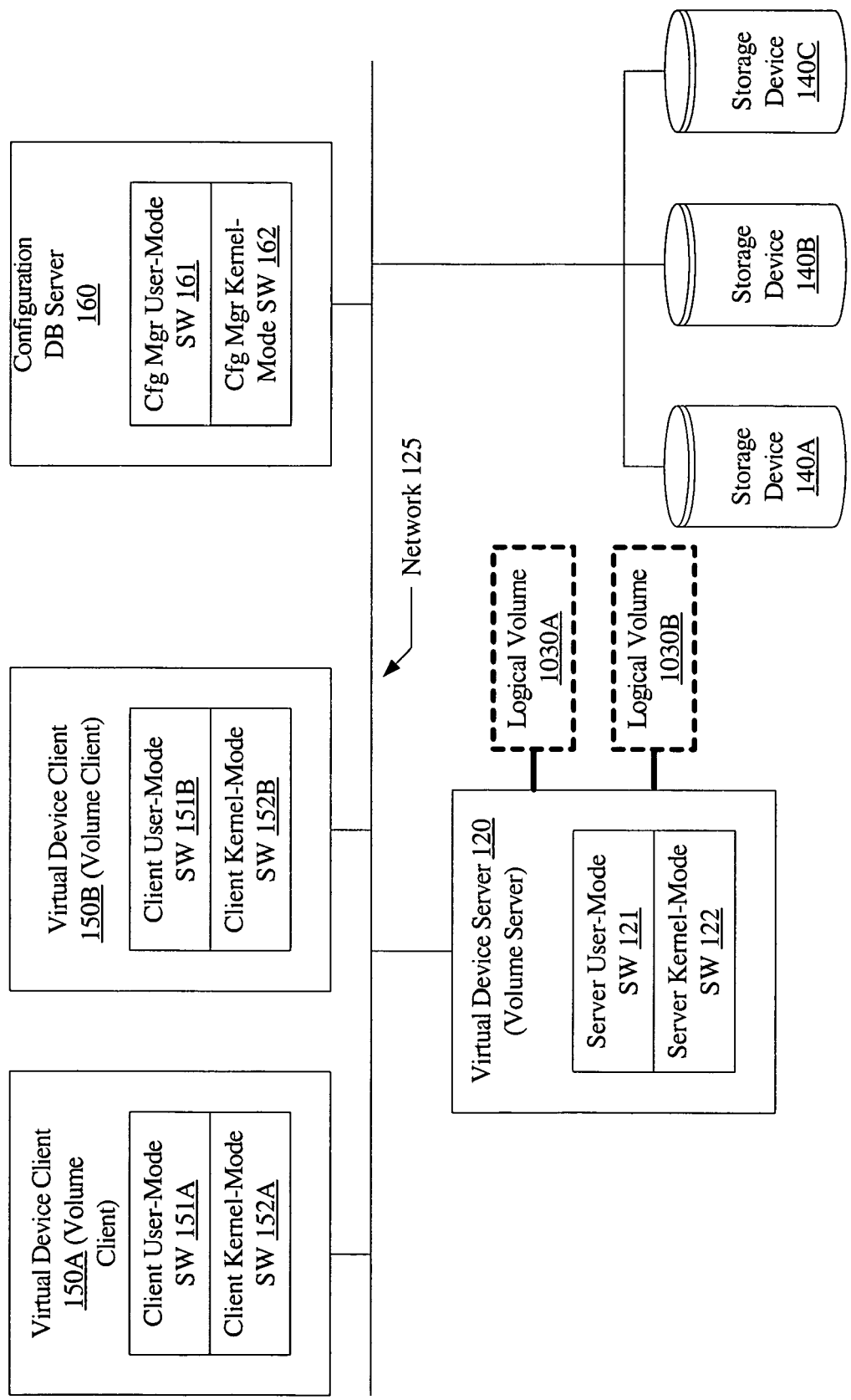
FIG. 10 is a block diagram illustrating an embodiment where a virtual device server is configured to provide block virtualization.

As noted earlier, a number of different virtualization primitives may be utilized for distributed storage virtualization in different embodiments. FIG. 10 is a block diagram illustrating an embodiment where a virtual device server 120 is configured to provide block virtualization, and the virtual storage devices presented by the virtual device server 120 are block virtual devices or logical volumes 1030.

Generally speaking, a block device may comprise any hardware or software entity that provides a collection of linearly addressed data blocks that can be read or written. For example, in one embodiment a physical block device may be a single disk drive configured to present all of its sectors as an indexed array of blocks. It is contemplated that any suitable type of storage device may be configured as a block device, such as fixed or removable magnetic media drives (e.g., hard drives, floppy or Zip-based drives), writable or read-only optical media drives (e.g., CD or DVD), tape drives, solid-state mass storage devices, or any other type of storage device. In some embodiments, a block device may also be a logical or virtual storage device resulting from a mapping of blocks of one or more physical storage devices, as described in greater detail below.

Hardware devices configured to provide a collection of linearly addressed data blocks may generally be referred to as physical block devices, and logical or virtual storage devices so configured may generally be referred to as logical or virtual block devices. It is contemplated that in some embodiments, data blocks may be uniformly sized across different physical and logical block devices, while in other embodiments physical and logical block devices may employ different block sizes. It is also contemplated that in some embodiments, block sizes may vary among particular physical block devices and/or particular logical block devices, or even within a given block device.

A block device may differ from a file in that it may not require use of a file system for access; that is, a consumer of a block device may read or write blocks directly to the device, bypassing any file system that may be in use. In some embodiments, a block device presented by an operating system for use by a consumer may present relatively few primitives through which the device may be manipulated. For example, in one embodiment a block device may support open, close, read and write primitives, plus a few miscellaneous control and query primitives. In contrast, file systems may provide a richer set of primitives, such as support for creating and removing files, appending to files, creating and removing directories, etc. Typical interfaces to block devices may allow for higher raw throughput and greater concurrency than typical interfaces to single files of a file system. Block devices that are physical storage devices, such as disks or tape drives, may be configured to present some form of SCSI interface, though other interfaces are possible and contemplated.

Generally speaking, a logical volume 1030 (which may also be referred to herein as a volume) may comprise a block device that may be presented directly for use by a block device consumer, e.g., a virtual device client 150. A virtual device client accessing a volume may be termed a volume client herein. In one embodiment, a volume client may be a file system or an application (such as a database application, for example) that can directly use block devices. As described in greater detail below, in some embodiments employing block device virtualization, a given volume 1030 may be associated with several logical or physical block devices. In such embodiments, each block device included in the logical organization of a given volume or virtualized block device may be referred to as a storage object or logical storage object.

A volume may differ from a block device interface implemented in a hardware device or that is accessed through a system disk driver, in that the latter block devices may not present a system-independent block device interface that can be opened for direct use by a consumer. Instead, a system-dependent disk driver may be required to access such block devices. In embodiments employing block virtualization, such a disk driver may be generally unaware of block virtualization and may in some instances present a barrier to using some virtualization techniques, whereas a volume implementing various block virtualization features may be directly accessible by a consumer without the issues presented by such disk drivers.

A volume manager, such as virtual device server 120, which may also be referred to as a volume server in block virtualization environments, may introduce virtualization of blocks, creating some number of virtualized block devices out of one or more physical or logical block devices. (In some embodiments, devices such as disk arrays and virtualization switches may also be configured to perform block virtualization.) In one embodiment of block virtualization, one or more layers of software and/or hardware rearrange blocks from one or more block devices, such as disks, and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of virtualization may be implemented. That is, one or more block devices may be mapped into a particular virtualized block device, which may be in turn mapped into still another virtualized block device, allowing complex storage functions to be implemented with simple block devices.

In various embodiments, block virtualization can support the creation of virtualized block devices implementing numerous different types of storage functions. For example, in one embodiment a virtualized block device may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or static image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, for example, and/or various capabilities for online reorganization of virtual device structure, such as online data migration between devices. Block virtualization may provide any or all of these capabilities in a fashion transparent to virtualized block device consumers. That is, virtualized block devices may appear as generic storage devices to consumers such as file systems and applications.

A volume server 120 may provide functions such as configuration management of virtualized block devices and distributed coordination of block device virtualization. For example, in one embodiment a volume server 120 may be aware of the type and quantity of physical storage devices 140 that are available within a storage system. In various embodiments, the virtualization functions provided by a volume server 120 may be provided at different levels in the storage hierarchy between a volume client 150 and storage devices 140.

For example, in one embodiment, volume clients 150 may be provided with a description of a virtualized block device and may be configured to directly access constituent block devices comprising the virtualized device. Such virtualization may also be referred to as host-based or client-based virtualization. In response to a request to configure a virtual block device, for example according to a desired set of virtualization features, a volume server 120 may be configured to build a volume description that describes how a collection of storage objects compliant with the desired features maps to underlying physical block devices. Volume metadata, such as the volume description identifying a particular volume 1030 may be distributed to one or more volume clients 150 over a secure kernel-mode connection 220. In one embodiment, such a volume description may be a tree of storage objects such as described in greater detail below in conjunction with the description of FIG. 11. Each volume client 150 may be configured to interact with volume server 120 for certain functions, for example management or administrative functions. For typical block read and write activity, each volume client 150 may be configured to interact directly with various block devices 140 according to the volume description distributed by volume server 120.

The structure of the volume 1030, for example as indicated by its corresponding storage object tree, may indicate to a given volume client 150 how the volume relates to one or more underlying physical storage devices. In one embodiment, the leaf nodes of such a tree may correspond to one or more physical block devices such as storage devices 140, and the root node of such a tree may be a logical block device through which the volume is accessed by a consumer. Distribution of a virtualized block device as a volume to one or more volume clients 150 may also be referred to as distributed block virtualization. In some embodiments, after volume server 120 has distributed a volume description of a given virtual block device to a given volume client 150 as a particular volume 1030, the given volume client 150 may interact with that particular volume 1030 to read and write blocks without further involvement on the part of volume server 120, as described above. That is, the given volume client 150 may use the structure of the particular volume 1030 to transform I/O requests generated by various consumers of that volume 1030 into I/O requests directed to specific physical storage devices, such as devices 140.

Figure 11:
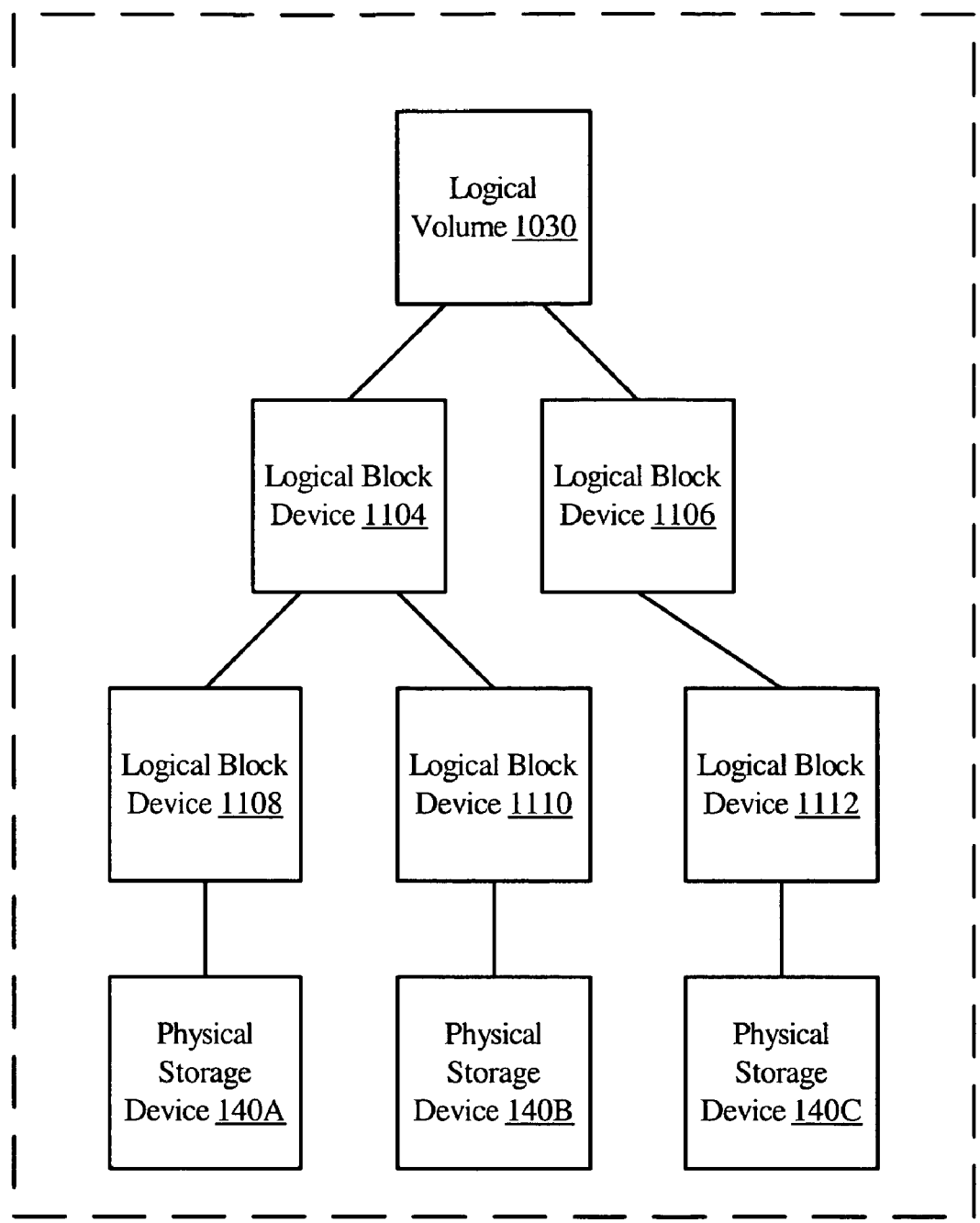
FIG. 11 is a block diagram illustrating one embodiment of a virtualized block device that may be presented to a volume client.

One embodiment of a virtualized block device that may be presented to a volume client 150 as a volume 1030 is illustrated in FIG. 11. In the illustrated embodiment, volume 1030 includes logical block devices 1104 and 1106. In turn, logical block device 1104 includes logical block devices 1108 and 1110, while logical block device 1106 includes logical block device 1112. Logical block devices 1108, 1110, and 1112 map to physical block devices 140A-C of FIG. 6, respectively.

Each block device within volume 1030 that maps to or includes another block device may include an interface whereby the mapping or including block device may interact with the mapped or included device. For example, this interface may be a software interface whereby data and commands for block read and write operations is propagated from lower levels of the virtualization hierarchy to higher levels and vice versa.

Additionally, a given block device may be configured to map the logical block spaces of subordinate block devices into its logical block space in various ways in order to realize a particular virtualization function. For example, in one embodiment, volume 1030 may be configured as a mirrored volume, in which a given data block written to volume 1030 is duplicated, and each of the multiple copies of the duplicated given data block are stored in respective block devices. Volume 1030 may duplicate a write operation and issue the write operation to both logical block devices 1104 and 1106, such that the block is written to both devices. In this context, logical block devices 1104 and 1106 may be referred to as mirror devices. In various embodiments, volume 1030 may read a given data block stored in duplicate in logical block devices 1104 and 1106 by issuing a read operation to one mirror device or the other, for example by alternating devices or defaulting to a particular device. Alternatively, volume 1030 may issue a read operation to multiple mirror devices and accept results from the fastest responder.

As described above and shown in FIG. 11, in some embodiments a virtualized block device may employ multiple layers of virtualization. For example, in the embodiment described above where logical block devices 1104 and 1106 function as mirror devices, it may be the case that underlying physical block devices 140A-C have dissimilar performance characteristics; specifically, devices 140A-B may be slower than device 140C.

In order to balance the performance of the mirror devices, in one embodiment, logical block device 1104 may be implemented as a striped device in which data is distributed between logical block devices 1108 and 1110. For example, even- and odd-numbered blocks (or groups of blocks) of logical block device 1104 may be mapped to logical block devices 1108 and 1110 respectively, each of which may be configured to map in turn to all or some portion of physical block devices 140A-B respectively. In such an embodiment, block read/write throughput may be increased over a non-striped configuration, as logical block device 1104 may be able to read or write two blocks concurrently instead of one. Numerous striping arrangements involving various distributions of blocks to logical block devices are possible and contemplated; such arrangements may be chosen to optimize for various data usage patterns such as predominantly sequential or random usage patterns.

In another aspect illustrating multiple layers of block virtualization, in one embodiment physical block device 140C may employ a different block size than logical block device 1106. In such an embodiment, logical block device 1112 may be configured to translate between the two physical block sizes and to map the logical block space defined by logical block device 1106 to the physical block space defined by physical block device 140C. In some instances, the logical block space of logical block device 1112 need not be contiguously mapped to blocks of physical block device 140C; an arbitrary mapping may be used.

Numerous other possible configurations of block devices are contemplated that may incorporate more or fewer layers of virtualization to realize within a given instance of volume 1030 virtualization functions similar to or different from those described above. For example, volume 1030 may employ a greater number of mirror devices, striping may occur higher in the hierarchy than mirroring, certain logical block devices may be configured to perform snapshots of other devices, certain logical block devices may span multiple physical block devices, etc.

In one embodiment, volume server 120 may be configured to read and update configuration information corresponding to volume descriptions (such as a storage object tree corresponding to a given volume) from configuration database server 160. The configuration information in the database may establish the logical configuration of data on the physical storage devices 140. For example, such configuration information may indicate how various logical and physical block devices are divided, striped, mirrored, etc. In one embodiment, the configuration information may be stored on the devices (e.g., block devices 140) that are being virtualized. It is contemplated that in some embodiments, configuration of a given virtualized block device may be managed and/or stored in data structures other than trees of objects. For example, in one embodiment, tables may be used to map virtual block devices to physical storage.

As noted above, the configuration associated with a virtual block device may change over time, such as to add or remove mirrors; migrate data to new storage; increase or decrease the size of the device; create, manipulate, or remove snapshots; add structure for a new capability; etc. In some embodiments, if the volume description of a given volume 1030 is distributed to more than one volume client 150, any changes that affect the structure of the given volume 1030 may need to be coherently coordinated among the relevant volume clients 150. In one embodiment volume server 120 may be configured to coordinate such changes, typically using secure kernel-mode network connections 220. For example, volume server 120 may be configured to coordinate quiescence of those volume clients 150 to which the given volume 1030 is distributed, in order to temporarily suspend activity to given volume 1030. Volume server 120 may further distribute changes to the structure of given volume 1030 to relevant volume clients 150 in an effectively atomic fashion over secure kernel-mode connections 220, such that either all or none of the relevant clients 150 receive the changes.

In some embodiments, volume server 120 may be configured to distribute all defined volumes 1030 to each volume client 150 present within a system. Such embodiments may be referred to as symmetric distributed block virtualization systems. In other embodiments, specific volumes may be distributed only to respective volume clients 150, such that at least one volume 1030 is not common to two volume clients 150. Such embodiments may be referred to as asymmetric distributed block virtualization systems.

As described above, a virtual device server or volume server 120 may be configured to send metadata such as volume layout information over a secure kernel-mode connection 220 to a virtual device client or volume client 150. In addition, a volume server 120 may also send messages granting and/or revoking access to a given volume over the secure kernel-mode connection, e.g., during a volume reorganization. A volume server 120 may utilize secure kernel-mode connections 220 with configuration database server 160 to retrieve or save volume configuration changes. A volume client 150 may send a request to obtain access to a given volume 1030 to a volume server 150 over a secure kernel-mode connection 220, and may also use a secure kernel-mode connection 220 to send an indication of an I/O error (e.g., a failure of a read or a write operation) to the volume server 120. The volume server 120 may be configured to take corrective action, such as repairing a volume 1030 or disabling access to a volume 1030, in response to such an I/O error. In some embodiments, a volume client 150 may also use a secure kernel-mode connection 220 to send a request for a remote or indirect I/O operation (e.g., an I/O operation performed by the volume server 120 or by another volume client 150 at a physical storage device not directly accessible from the requesting volume client). Requests to obtain locks on one or more blocks of a volume 1030, or to update special structures such as Dirty Region Logs (DRLs) used for rapid synchronization of mirrored logical volumes may also be sent over secure kernel-mode connections 220 by volume clients. In one embodiment, "heartbeat" or "I-am-alive" may be sent periodically by one virtualization participant to another over secure kernel-mode connections 220, indicating that the sending virtualization participant is operating normally.

Figure 12:
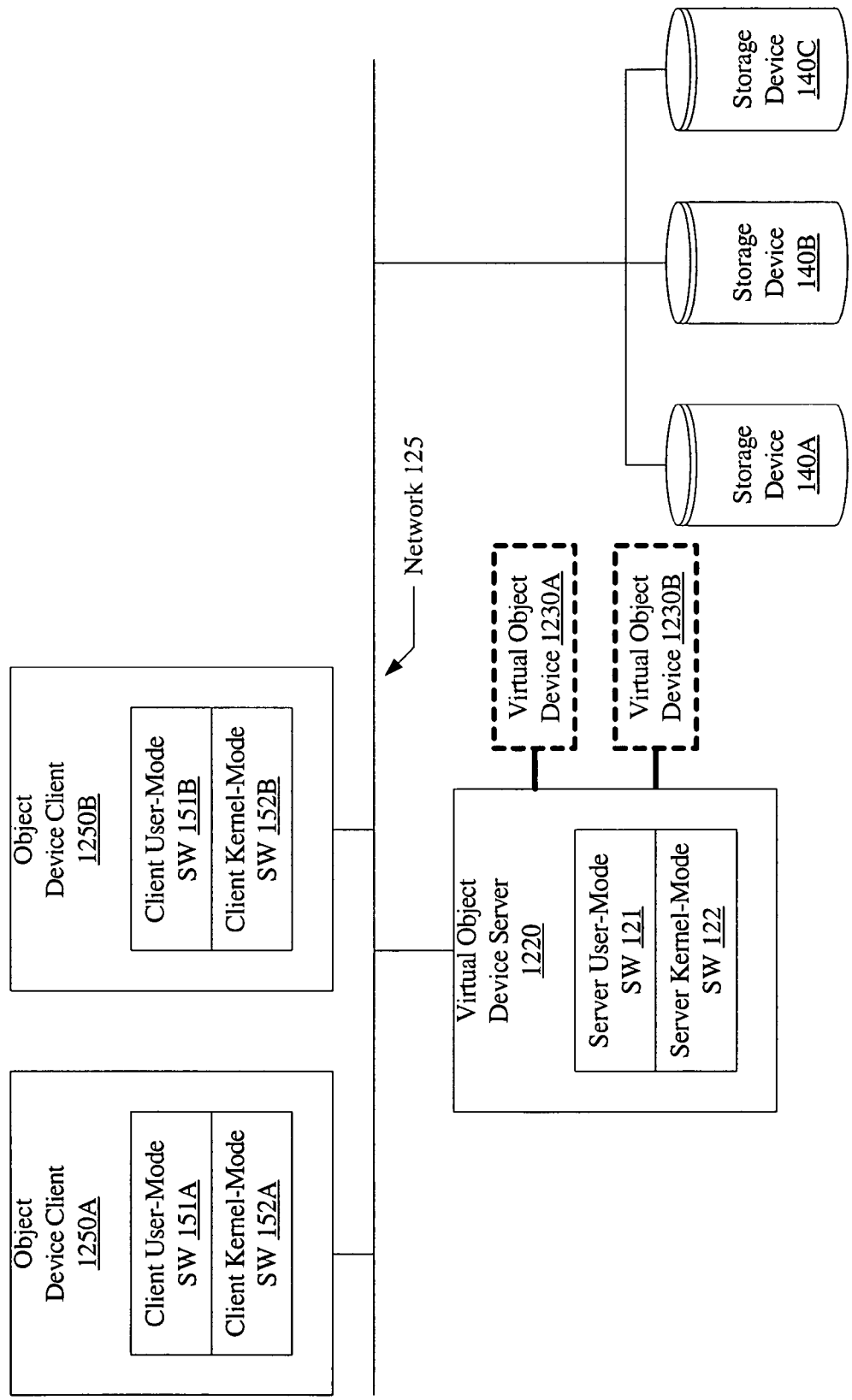
FIG. 12 is a block diagram illustrating an embodiment of an object-based storage virtualization system employing secure kernel-mode network connections.

In contrast to block virtualization environments, in some embodiments, object-based virtualization may be employed: that is, a virtual object device server may be configured to organize storage within storage devices 140 as higher-level logical objects (such as files) instead of using the block-based interface described above. FIG. 12 is a block diagram illustrating an embodiment of an object-based storage virtualization system employing secure kernel-mode network connections as described above. In an object virtualization environment, virtual storage may be named, managed, and made accessible using any desired base object as implemented by virtual object device server 1220, such as a file object or a database table object. Thus, in one embodiment, an object device client 1250A may be presented with a virtual object device 1230A consisting of a collection of named files, and may perform file-based operations (such as reads from a file, writes to a file, increasing the size of a file, truncating a file, etc.) directly on the virtual storage device. Once virtual objects have been created and configured, virtual object device server 1220 may distribute metadata on the virtual objects to object device clients 1250 over secure kernel-mode connections 220, allowing the object storage consumers to perform input/output (I/O) operations on the virtual objects without further interaction with virtual object device server 1220.

It is noted that combinations of the different virtualization techniques described above may be employed within different embodiments of system 100. For example, in one embodiment, a single storage environment may employ both block virtualization and object-based virtualization.

In general, a host 101 may include one or more processors, one or more memories, one or more network interface cards, local storage and any desired peripheral devices such as a mouse, keyboard, etc. Any type of host 101 (e.g., a server or a desktop computer system) capable of supporting the user-mode and kernel-mode layers of a virtualization stack described above may be used as a virtualization participant, such as a virtual device server, a virtual device client, or a configuration database server. Part of the virtualization functionality described above may also be performed by a device such as a virtualizing switch or a virtualization appliance in some embodiments. Numerous other configurations of virtualization participants are possible and contemplated. Storage devices 140 may include any desired combination of devices such as individual disks, disk array devices, intelligent disk arrays, etc. and may be directly attached to hosts 101 or accessible using any suitable network technology, such as IP, fibre channel, etc.

FIG. 13 is a block diagram of one embodiment of a computer accessible medium 1300 containing distributed service software 1310 configured to implement secure kernel-mode communication as described above. In different embodiments, distribute service software 1310 may be provided to a computer system using a variety of computer-accessible media including electronic media (e.g., flash memory), magnetic media such as RAM (e.g., SDRAM, RDRAM, SRAM, etc.), optical storage media such as CD-ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a first host including a first kernel-mode software layer and a first user-mode software layer of a distributed software service; and
   a second host including a second kernel-mode software layer and a second user-mode software layer of the distributed software service;
   wherein the first host is configured to initiate a process configured to secure kernel-to-kernel communication between the first host and the second host, wherein said first host is configured to:
   establish a user-mode network connection between the first user-mode software layer and the second user-mode software layer, the user-mode network connection being configured to use a secure communication protocol;
   transmit a first security key from the first user-mode software layer to the second user-mode software layer over the user-mode network connection;
   receive a second security key transmitted from the second user-mode software layer to the first user-mode software layer over the user-mode network connection; and
   subsequent to receiving the second security key, initiate establishment of a kernel-mode network connection between the first kernel-mode software layer and the second kernel-mode software layer, wherein the kernel-mode connection is a different connection than the user-mode connection and uses a protocol that does not support said secure communication protocol;
   wherein each of the first and second hosts are configured to use the first and second security keys to secure communication between the first kernel-mode software layer and the second kernel-mode software layer over the kernel-mode network connection.

2. The system as recited in claim 1, wherein said kernel-mode network connection is established using one of a kernel sockets interface, Transport Level Interface, or X/Open Transport Interface.

3. The system as recited in claim 1, wherein the first and second security keys are public keys, wherein the first host is further configured to:
   upload the second security key and a first private key from the first user-mode software layer to the first kernel-mode software layer; and
   use the second security key to encrypt a first message sent to the second host over the kernel-mode network connection; and use the first private key to decrypt a second message received at the first host over the kernel-mode network connection.

4. The system as recited in claim 1, wherein first host is further configured to:
send a first encoded authentication token to the second host over the kernel-mode network connection; and
wherein the second host is further configured to:
validate the first encoded authentication token using the second security key.

5. The system as recited in claim 1, wherein the first host is further configured to:
encrypt a message before sending the message over the kernel-mode network connection.

6. The system as recited in claim 1, wherein the first host is further configured to:
validate a message received over the kernel-mode network connection using a secure sequence number.

7. The system as recited in claim 1, wherein the first host is further configured to:
validate a message received over the kernel-mode network connection using a checksum.

8. The system as recited in claim 1, wherein the distributed software service is a storage virtualization service, the first host is a virtual device client and the second host is a virtual device server.

9. The system as recited in claim 8, further comprising one or more physical storage devices, wherein the virtual device server is further configured to:
aggregate storage within the one or more physical storage devices into a virtual storage device; and
provide metadata for the virtual storage device to the virtual device client over the secure kernel-mode connection.

10. The system as recited in claim 9, wherein the virtual storage device is a virtual block device.

11. The system as recited in claim 9, wherein the virtual storage device is a virtual object device.

12. The system as recited in claim 9, wherein the user-mode network connection and the kernel-mode network connection are established over a first network, wherein the one or more physical storage devices are linked to the virtual device client by a second network, wherein the virtual device client is configured to perform I/O operations on the one or more physical storage devices via the second network.

13. The system as recited in claim 12, wherein the first network is an Internet Protocol (IP) network and the second network is a fibre-channel network.

14. A method comprising:
a first host initiating a process configured to secure kernel-to-kernel communication between the first host and the second host, wherein said process comprises the first host:
establishing a user-mode network connection between a first user-mode software layer of a distributed software service at the first host and a second user-mode software layer of the distributed software service at a second host, the user-mode network connection being configured to use a secure communication protocol;
transmitting a first security key from the first user-mode software layer of the distributed software service at the first host to the second user-mode software layer of the distributed software service at the second host over the user-mode network connection;
receiving a second security key transmitted from the second user-mode software layer to the first user-mode software layer over the user-mode network connection; and
subsequent to receiving the second security key, initiating establishment of a kernel-mode network connection between a first kernel-mode software layer of the first host and a second kernel-mode software layer of the second host, wherein the kernel-mode connection is a different connection than the user-mode connection and uses a protocol that does not support said secure communication protocol; and
using the first and second security keys to secure communication over the kernel-mode network connection between the first kernel-mode software layer at the first host and the second kernel-mode software layer at the second host.

15. The method as recited in claim 14, wherein said kernel-mode network connection is established using one of a kernel sockets interface, Transport Level Interface, or X/Open Transport Interface.

16. The method as recited in claim 14, wherein the first and second security keys are public keys, further comprising:
uploading the second security key and a first private key from the first user-mode software layer to the first kernel-mode software layer at the first host; and
using the second security key to encrypt a first message sent to the second host over the kernel-mode network connection; and
using the first private key to decrypt a second message received at the first host over the kernel-mode network connection.

17. The method as recited in claim 14, further comprising:
sending a first encoded authentication token from the first host to the second host over the kernel-mode network connection; and
validating the first encoded authentication token at the second host using the second security key.

18. The method as recited in claim 14, further comprising:
encrypting a message before sending the message over the kernel-mode network connection.

19. A computer accessible medium comprising program instructions, wherein the program instructions are computer-executable to:
initiate a process configured to secure kernel-to-kernel communication between a first host and a second host, wherein said program instructions are executable to cause the first host to:
establish a user-mode network connection between a first user-mode software layer of a distributed software service at the first host and a second user-mode software layer of the distributed software service at a second host, the user-mode network connection being configured to use a secure communication protocol;
transmit a first security key from the first user-mode software layer of the distributed software service at the first host to the second user-mode software layer of the distributed software service at the second host over the user-mode network connection;
receive a second security key transmitted from the second user-mode software layer to the first user-mode software layer over the user-mode network connection; and
subsequent to receiving the second security key, cause the first host to initiate establishment of a kernel-mode network connection between a first kernel-mode software layer of the first host and a second kernel-mode software layer of the second host, wherein the kernel-mode connection is a different connection than the user-mode connection and uses a protocol that does not support said secure communication protocol;

use the first and second security keys to secure communication over the kernel-mode network connection between the first kernel-mode software layer at the first host and the second kernel-mode software layer at the second host.

20. The computer accessible medium as recited in claim 19, wherein said kernel-mode network connection is established using one of a kernel sockets interface, Transport Level Interface, or X/Open Transport Interface.

21. The computer accessible medium as recited in claim 19, wherein the first and second security keys are public keys, wherein the program instructions are further computer-executable to:

upload the second security key and a first private key from the first user-mode software layer to the first kernel-mode software layer at the first host; and use the second security key to encrypt a first message sent to the first host over the kernel-mode network connection; and use the first private key to decrypt a second message received at the first host over the kernel-mode network connection.

22. The computer accessible medium as recited in claim 19, wherein the program instructions are further computer-executable to:

send a first encoded authentication token from the first host to the second host over the kernel-mode network connection; and validate the first encoded authentication token at the second host using the second security key.

23. The computer accessible medium as recited in claim 19, wherein the program instructions are further computer-executable to:

encrypt a message before sending the message over the kernel-mode network connection.

* * * * *